(12) United States Patent
Takami et al.

(10) Patent No.: US 12,134,989 B2
(45) Date of Patent: Nov. 5, 2024

(54) COMPRESSED AIR SUPPLY SYSTEM

(71) Applicant: KAWASAKI JUKOGYO KABUSHIKI KAISHA, Kobe (JP)

(72) Inventors: Hiroaki Takami, Kobe (JP); Naoya Sekoguchi, Kobe (JP); Katsuhiko Ishida, Kobe (JP); Kenta Umezaki, Kobe (JP); Hiroshi Sakamoto, Kobe (JP); Tatsuhiko Goi, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/250,940

(22) PCT Filed: Oct. 28, 2020

(86) PCT No.: PCT/JP2020/040541
§ 371 (c)(1),
(2) Date: Apr. 27, 2023

(87) PCT Pub. No.: WO2022/091274
PCT Pub. Date: May 5, 2022

(65) Prior Publication Data
US 2024/0003302 A1 Jan. 4, 2024

(51) Int. Cl.
*F02C 7/32* (2006.01)
(52) U.S. Cl.
CPC ..................... *F02C 7/32* (2013.01)
(58) Field of Classification Search
CPC ..... F02C 6/08; F02C 7/32; F02C 7/36; B64D 13/00–08
See application file for complete search history.

(56) References Cited

U.S. PATENT DOCUMENTS

| | | | |
|---|---|---|---|
| 2006/0137355 A1 | 6/2006 | Welch et al. | |
| 2010/0200692 A1* | 8/2010 | Goi | F16H 61/6649 244/58 |
| 2012/0117982 A1* | 5/2012 | Suciu | F02C 7/32 60/802 |
| 2015/0275769 A1* | 10/2015 | Foutch | F02C 7/047 60/776 |
| 2016/0167790 A1 | 6/2016 | Hipsky et al. | |
| 2017/0363098 A1* | 12/2017 | Taylor | F02C 7/32 |

(Continued)

FOREIGN PATENT DOCUMENTS

| | | |
|---|---|---|
| JP | 2008-525684 A | 7/2008 |
| JP | 2019-056458 A | 4/2019 |

*Primary Examiner* — Jason H Duger
(74) *Attorney, Agent, or Firm* — Studebaker & Brackett PC (57) ABSTRACT

A compressed air supply system includes: a bleed air passage; an auxiliary compressor structure including a compressor inlet and a compressor outlet, the compressor inlet being fluidly connected to the bleed air passage; a supply passage which is fluidly connected to the compressor outlet and through which compressed air from the auxiliary compressor structure is supplied to an air cycle machine; an accessory gear box; and a continuously variable transmission structure that changes speed of rotational driving force output from the accessory gear box and rotates the auxiliary compressor structure. The continuously variable transmission structure and the auxiliary compressor structure are fixed to the accessory gear box, and the accessory gear box is fixed to the gas turbine engine.

5 Claims, 6 Drawing Sheets

(56) References Cited

U.S. PATENT DOCUMENTS

| 2018/0202310 | A1* | 7/2018 | Suciu | F02C 7/32 |
| 2018/0202368 | A1* | 7/2018 | Suciu | F01D 15/10 |
| 2019/0218977 | A1* | 7/2019 | Muldoon | F02C 7/32 |

* cited by examiner

COMPRESSED AIR SUPPLY SYSTEM

CROSS-REFERENCE TO RELATED APPLICATIONS

This application is the U.S. National Stage of International Application No. PCT/JP2020/040541 filed on Oct. 28, 2020, the entire content of which is incorporated herein by reference

TECHNICAL FIELD

The present disclosure relates to a compressed air supply system.

BACKGROUND ART

Conventionally, a bleed air system for environmental control of an aircraft is known (see PTL 1, for example). In this system, driving force of a gas turbine engine is input to a transmission, and an auxiliary compressor is driven by the driving force which has been changed in speed by the transmission. The auxiliary compressor compresses bleed air of the engine and supplies the air to an air cycle machine (ACM).

CITATION LIST

Patent Literature

PTL 1: U.S. Patent Application Publication No. 2016/0167790

SUMMARY OF INVENTION

Technical Problem

In a conventional system, power transmitting structures including a gas turbine engine, a transmission, a gear box, and an auxiliary compressor tend to increase in size. Moreover, since the conventional system requires the transmission and the auxiliary compressor, and in addition, requires a power transmitting structure that inputs the driving force of the engine to the transmission and a power transmitting structure that inputs to the compressor the driving force output from the transmission, mountability of these is desired to be improved.

An object of one aspect of the present disclosure is to reduce the sizes of power transmitting structures including a gas turbine engine, a transmission, a gear box, and an auxiliary compressor and realize optimal arrangement corresponding to components of the gas turbine engine.

Solution to Problem

A compressed air supply system according to one aspect of the present disclosure includes: a bleed air passage through which bleed air from a gas turbine engine flows; an auxiliary compressor structure including a compressor inlet and a compressor outlet, the compressor inlet being fluidly connected to the bleed air passage; a supply passage which is fluidly connected to the compressor outlet and through which compressed air from the auxiliary compressor structure is supplied to an air cycle machine; an accessory gear box which houses a power transmitting structure and to which rotational driving force of the gas turbine engine is input, the power transmitting structure including rotating shafts and gears; and a transmission structure that changes speed of the rotational driving force output from the accessory gear box and rotates the auxiliary compressor structure. The transmission structure and the auxiliary compressor structure are fixed to the accessory gear box. The accessory gear box is fixed to the gas turbine engine.

According to the above configuration, since the accessory gear box, the transmission structure, and the auxiliary compressor structure are included in the assembly, the size of equipment that transmits the driving force from the gas turbine engine to the auxiliary compressor structure can be reduced, and the equipment can be easily mounted on the gas turbine engine.

Advantageous Effects of Invention

According to one aspect of the present disclosure, the sizes of the power transmitting structures including the gas turbine engine, the transmission, the gear box, and the auxiliary compressor can be reduced, and the mountability can be improved.

DESCRIPTION OF EMBODIMENTS

Hereinafter, an embodiment will be described with reference to the drawings. In the following description, "front" denotes an upstream side in a direction in which air flows in an engine, and "rear" denotes a downstream side in the direction in which the air flows in the engine. To be specific, "front" denotes a side where a fan is located in an axial direction of a rotating shaft of the engine, and "rear" denotes an opposite side of the side where the fan is located in the axial direction of the rotating shaft of the engine. A "radial direction" denotes a direction orthogonal to a rotation axis of the rotating shaft of the engine. A "circumferential direction" is a direction around the rotation axis of the rotating shaft of the engine.

Figure 1:
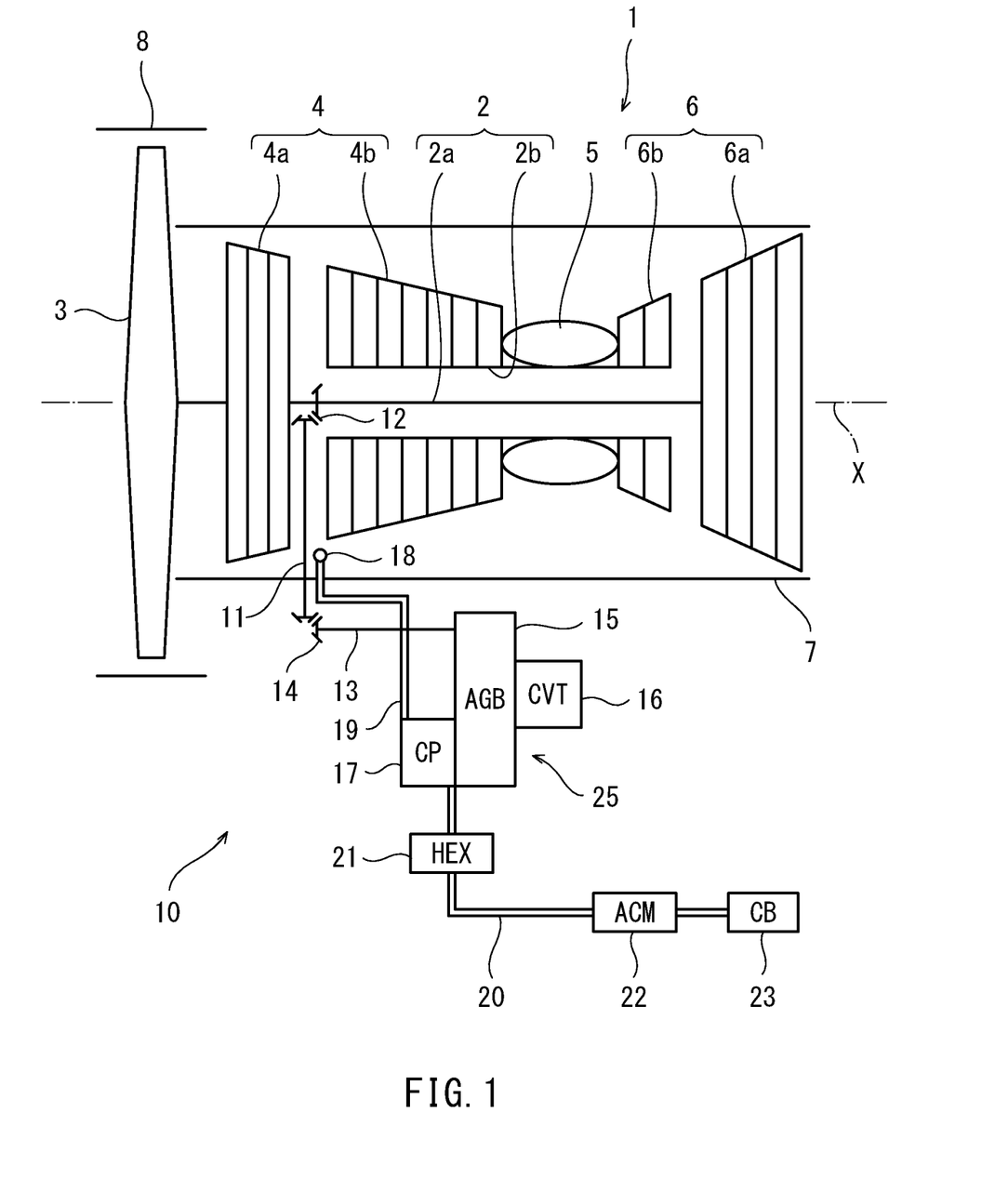
FIG. 1 is a schematic diagram showing a compressed air supply system of an aircraft according to an embodiment.

FIG. 1 is a schematic diagram showing a compressed air supply system 10 of an aircraft according to the embodiment. As shown in FIG. 1, the aircraft includes a gas turbine engine 1 and the compressed air supply system 10. The gas turbine engine 1 includes a rotating shaft 2, a fan 3, a compressor 4, a combustor 5, a turbine 6, and a casing 7. The rotating shaft 2 extends in a front-rear direction of the gas turbine engine 1. The fan 3 is connected to a front portion of the rotating shaft 2 and rotates together with the rotating shaft 2. The compressor 4, the combustor 5, and the turbine 6 are lined up along the rotating shaft 2 in this order from the front side toward the rear side. The casing 7 is a tubular body including an axis that coincides with a rotation axis X of the rotating shaft 2. The casing 7 houses the rotating shaft 2, the compressor 4, the combustor 5, and the turbine 6.

The gas turbine engine 1 is a two-shaft gas turbine engine. The compressor 4 includes a low-pressure compressor 4a and a high-pressure compressor 4b located behind the low-pressure compressor 4a. The turbine 6 includes a low-pressure turbine 6a and a high-pressure turbine 6b located in front of the low-pressure turbine 6a. The rotating shaft 2 includes: a low-pressure shaft 2a that couples the low-pressure compressor 4a to the low-pressure turbine 6a; and a high-pressure shaft 2b that couples the high-pressure compressor 4b to the high-pressure turbine 6b. The high-pressure shaft 2b is a tubular shaft including a hollow space therein. The low-pressure shaft 2a is inserted into the hollow space of the high-pressure shaft 2b. The low-pressure turbine 6a is coupled through the low-pressure shaft 2a to the fan 3 located in front of the compressor 4.

A radially outer side of the fan 3 is covered with a tubular fan case 8. A cylindrical bypass passage is located between the casing 7 and the case 8. Air sucked by the fan 3 flows through this bypass passage and is ejected rearward to generate propulsive force.

The compressed air supply system 10 includes an assembly 25, and the assembly 25 includes an accessory gear box 15, a transmission structure 16, and an auxiliary compressor structure 17. The transmission structure 16 may be a device that can be fixed to the accessory gear box 15. For example, the transmission structure 16 may be a structure including a continuously variable transmission or an electric motor. A power extracting shaft 11 extending in the radial direction is mechanically connected to the low-pressure shaft 2a of the gas turbine engine 1 through a bevel gear 12. To be specific, the power extracting shaft 11 rotates in association with the low-pressure shaft 2a. A power transmitting shaft 13 extending rearward is mechanically connected to the power extracting shaft 11 through a bevel gear 14. The power transmitting shaft 13 is mechanically connected to a power transmitting structure inside the accessory gear box 15.

The accessory gear box 15 is fixed to the gas turbine engine 1. The continuously variable transmission structure 16 and the auxiliary compressor structure 17 are fixed to the accessory gear box 15. Each of the number of portions of the continuously variable transmission structure 16 which are fixed to the gas turbine engine 1 and the number of portions of the auxiliary compressor structure 17 which are fixed to the gas turbine engine 1 is smaller than the number of portions of the accessory gear box 15 which are fixed to the gas turbine engine 1. The continuously variable transmission structure 16 and the auxiliary compressor structure 17 may be fixed only to the accessory gear box 15 without being directly fixed to the gas turbine engine 1.

Driving force of the low-pressure shaft 2a of the gas turbine engine 1 is input to the continuously variable transmission structure 16 through the power extracting shaft 11, the power transmitting shaft 13, and the accessory gear box 15. The continuously variable transmission structure 16 changes the speed of the input driving force to appropriate rotational frequency and transmits the driving force to the auxiliary compressor structure 17 through the accessory gear box 15 to rotate the auxiliary compressor structure 17.

The compressed air supply system 10 includes a bleed air passage 19 fluidly connected to a bleed air port 18 of the gas turbine engine 1. The bleed air port 18 supplies part of the compressed air from the compressor 4 of the gas turbine engine 1 to the bleed air passage 12. The bleed air port 18 is located upstream of the high-pressure compressor 4b in the gas turbine engine 1 (i.e., at one side of the high-pressure compressor 4b which is close to the low-pressure compressor 4a). For example, the bleed air port 18 is located in a region between the low-pressure compressor 4a and the high-pressure compressor 4b. However, the bleed air port 18 may be located in a region corresponding to a portion of the low-pressure compressor 4a or a region corresponding to a portion of the high-pressure compressor 4b. With this, the compressed air compressed by the low-pressure compressor 4a flows into the bleed air passage 19 an flows as the bleed air.

The bleed air port 18 is fluidly connected to an inlet of the auxiliary compressor structure 17. A supply passage 20 is fluidly connected to an outlet of the auxiliary compressor structure 17. The supply passage 20 supplies the compressed air, discharged from the outlet of the auxiliary compressor structure 17, to an inlet of an air cycle machine 22. A heat exchanger 21 (precooler) is located at the supply passage 20. For example, by using the atmosphere, exhaust of a passenger room, or the like as a cooling medium, the heat exchanger 21 cools the compressed air flowing through the supply passage 20. An outlet of the air cycle machine 22 is fluidly connected to a passenger room 23.

The rotational frequency of the auxiliary compressor structure 17 is controlled such that the pressure of the supply passage 20 (for example, the pressure at the outlet of the auxiliary compressor structure 17) approaches required pressure. To be specific, an output rotational frequency of the continuously variable transmission structure 16 is controlled by the control of a change gear ratio of the continuously variable transmission structure 16 in accordance with the pressure of the supply passage 20.

Figure 2:
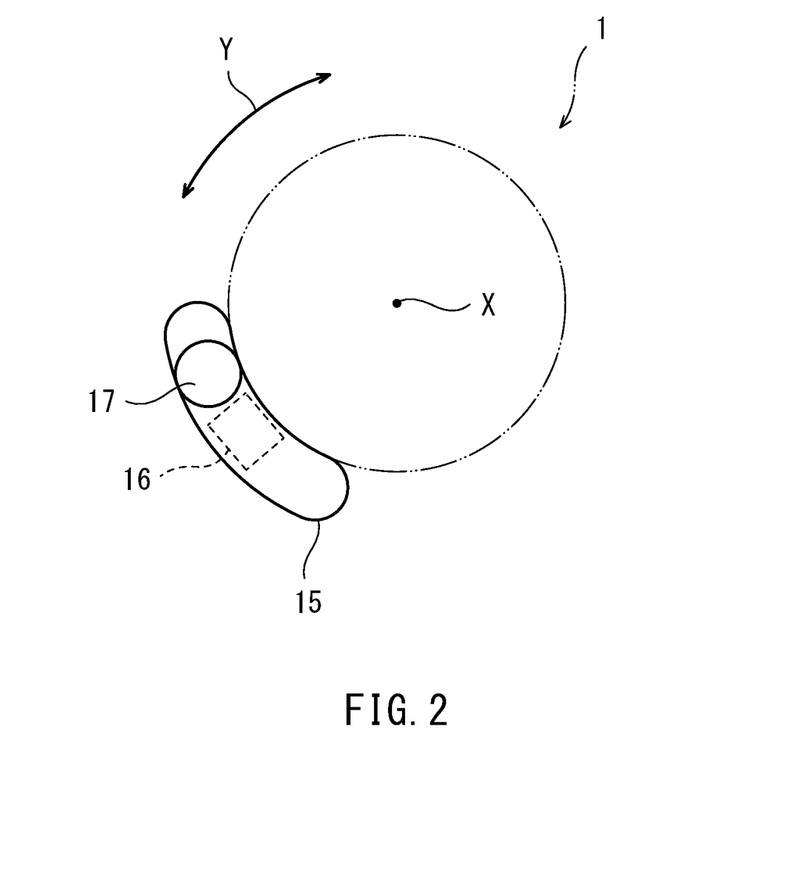
FIG. 2 is a front view showing an assembly including an accessory gear box, a continuously variable transmission structure, and an auxiliary compressor structure shown in FIG. 1, when viewed from a front side of a gas turbine engine.

FIG. 2 is a front view showing the assembly 25 including the accessory gear box 15, the continuously variable transmission structure 16, and the auxiliary compressor structure 17 shown in FIG. 1, when viewed from a front side of the gas turbine engine 1. As shown in FIG. 1, the accessory gear box 15 has a circular-arc shape extending along a circumferential direction Y of the gas turbine engine 1. To be specific, the accessory gear box 15 has an elongated shape extending in the circumferential direction Y of the gas turbine engine 1. The accessory gear box 15 may be located at the fan case 8 (see FIG. 1) or may be located inside or outside the casing 7.

The continuously variable transmission structure 16 and the auxiliary compressor structure 17 overlap the accessory gear box 15 in an axial direction X. The continuously variable transmission structure 16 and the auxiliary compressor structure 17 are adjacent to the accessory gear box 15 in the axial direction X. For example, the continuously variable transmission structure 16 and the auxiliary compressor structure 17 may be located so as to not to project outward in the radial direction beyond the accessory gear box 15. Each of the continuously variable transmission structure 16 and the auxiliary compressor structure 17 is shorter than the accessory gear box 15 in the longitudinal direction of the accessory gear box 15 (i.e., in the circumferential direction Y of the gas turbine engine 1).

Figure 3:
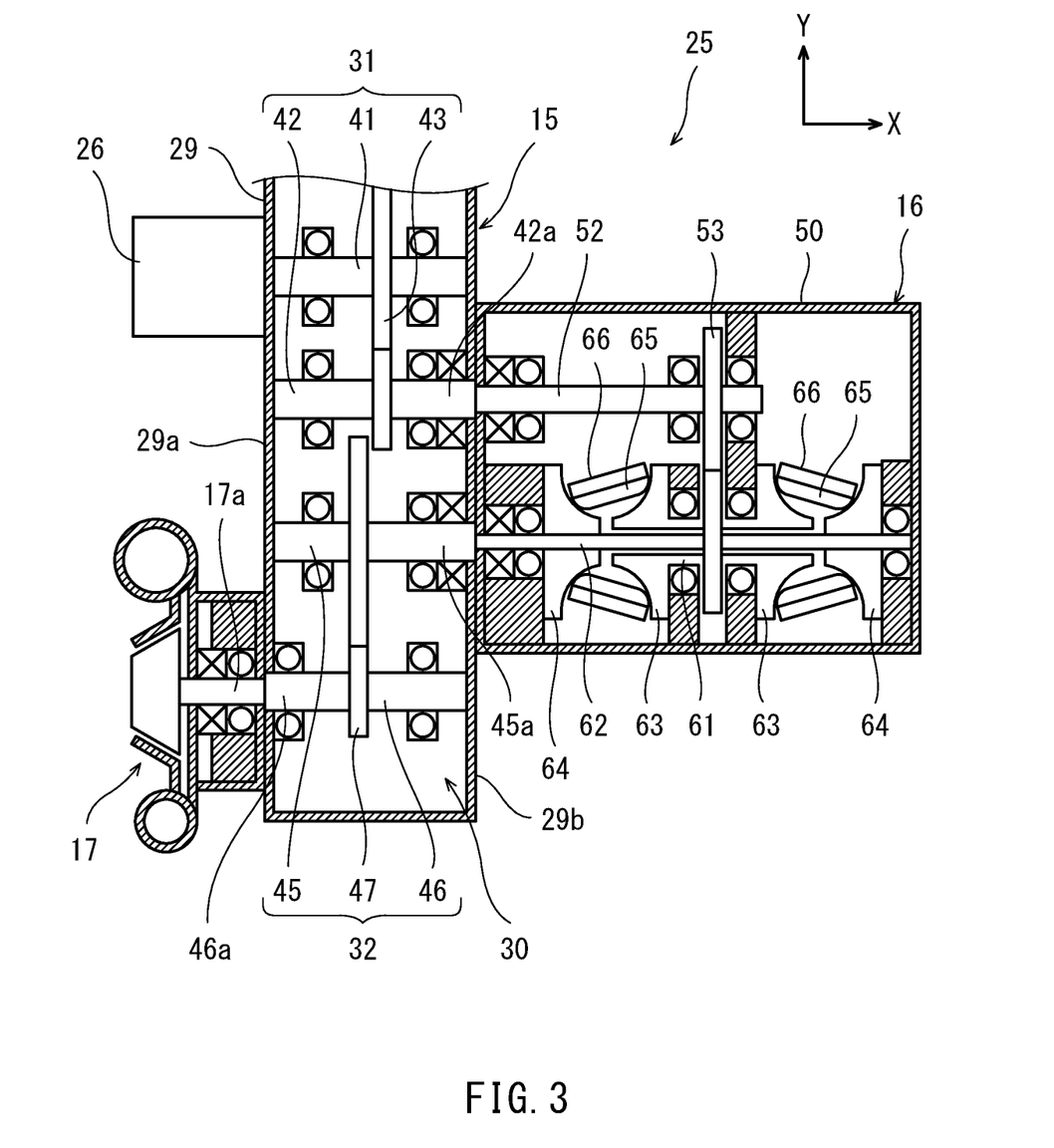
FIG. 3 is a sectional view showing the assembly including the accessory gear box, the continuously variable transmission structure, and the auxiliary compressor structure shown in FIG. 1.

FIG. 3 is a sectional view showing the assembly 25 including the accessory gear box 15, the continuously variable transmission structure 16, and the auxiliary compressor structure 17 shown in FIG. 1. As shown in FIG. 3, the accessory gear box 15 includes: a case 29 extending in the circumferential direction Y of the gas turbine engine 1 (see FIG. 1); and a power transmitting structure 30 housed in the case 29. The power transmitting structure 30 includes rotating shafts 41, 42, 45, and 46 and gears 43 and 47. The rotating shafts 41, 42, 45, and 46 extend in a width direction (i.e., the axial direction X) orthogonal to a longitudinal direction (i.e., the circumferential direction Y) of the accessory gear box 15 and are lined up in the longitudinal direction of the accessory gear box 15. The rotating shafts 41, 42, 45, and 46 are supported by the case 29 through bearings so as to be rotatable.

The power transmitting structure 30 includes a first power transmitting structure 31 and a second power transmitting structure 32. The first power transmitting structure 31 and the second power transmitting structure 32 are mechanically separated from each other. To be specific, the first power transmitting structure 31 and the second power transmitting structure 32 operate independently. Rotational driving force of the power transmitting shaft 13 is input to the first power transmitting structure 31.

The first power transmitting structure 31 includes an input rotating shaft (not shown), an intermediate rotating shaft 41, an output rotating shaft 42, and a gear 43. The rotational driving force input from the power transmitting shaft 13 (see FIG. 1) to the accessory gear box 15 is transmitted to the input rotating shaft of the first power transmitting structure 31. The intermediate rotating shaft 41 rotates in association with the input rotating shaft of the first power transmitting structure 31 through a gear. The output rotating shaft 42 rotates in association with the intermediate rotating shaft 41 through the gear 43.

The second power transmitting structure 32 includes an input rotating shaft 45, an output rotating shaft 46, and a gear 47. The output rotating shaft 46 rotates in association with the input rotating shaft 45 through the gear 47. The output rotating shaft 42 of the first power transmitting structure 31 and the input rotating shaft 45 of the second power transmitting structure 32 are located adjacent to each other but cannot transmit power to each other.

The auxiliary compressor structure 17 is fixed to a first side surface 29a of the case 29 of the accessory gear box 15. The first side surface 29a is a side surface opposite to a second side surface 29b. For example, the first side surface 29a is a surface facing the front side. The continuously variable transmission structure 16 is fixed to the second side surface 29b of the case 29 of the accessory gear box 15. For example, the second side surface 29b is a surface facing the rear side. The first side surface 29a is located closer to the bleed air port 18 than the second side surface 29b is. The direction of the auxiliary compressor structure 17 may be reversed.

The continuously variable transmission structure 16 includes a continuously variable transmission 51, a structure input shaft 52, a gear 53, and a case 50. The case 50 houses the continuously variable transmission 51, the structure input shaft 52, and the gear 53. The continuously variable transmission 51 is, for example, a toroidal CVT. The continuously variable transmission 51 includes a CVT input shaft 61, a CVT output shaft 62, input discs 63, output discs 64, power rollers 65, and trunnions 66. The CVT input shaft 61 and the CVT output shaft 62 are located on the same axis. The CVT input shaft 61 is a hollow tubular shaft and is shorter than the CVT output shaft 62. The CVT output shaft 62 is inserted into a hollow space of the CVT input shaft 61.

The CVT input shaft 61 and the CVT output shaft 62 are supported by the case 50 through bearings so as to be rotatable. Each input disc 63 is located at the CVT input shaft 61 so as to be integrally rotatable, and each output disc 64 is located at the CVT output shaft 62 so as to be integrally rotatable. The input disc 63 and the output disc 64 are opposed to each other to form a cavity having an annular shape.

The continuously variable transmission 51 is of, for example, a double-cavity type and includes the input discs 63 and the output discs 64 which are two pairs. Each power roller 65 is located in the cavity and sandwiched between the input disc 63 and the output disc 64. Each power roller 65 is supported by the trunnion 66 so as to be rotatable. The change gear ratio of the continuously variable transmission 51 is continuously changed in accordance with a tilt angle of the power roller 65. The tilt angle of the power roller 65 is changed by moving the position of the power roller 65 by an actuator (not shown).

The structure input shaft 52 is coupled to an end portion 42a (first end portion) of the output rotating shaft 42 of the first power transmitting structure 31 of the accessory gear box 15. For example, the structure input shaft 52 and the output rotating shaft 42 are located on the same axis. The structure input shaft 52 is located in parallel with the CVT input shaft 61 and the CVT output shaft 62 and is supported by the case 50 through bearings so as to be rotatable.

The rotational driving force transmitted from the output rotating shaft 42 of the accessory gear box 15 to the structure input shaft 52 is transmitted to the CVT input shaft 61 through the gear 53. When the CVT input shaft 61 rotates, the input discs 63 integrally rotate. The rotational driving force of the input disc 63 is transmitted to the output discs 64 through the power rollers 16. When the output disc 64 rotates, the CVT output shaft 62 integrally rotates.

An end portion 45a (second end portion) of the input rotating shaft 45 of the second power transmitting structure 32 of the accessory gear box 15 is coupled to the CVT output shaft 62 of the continuously variable transmission structure 16. For example, the CVT output shaft 62 and the input rotating shaft 45 are located on the same axis. The rotational driving force of the CVT output shaft 62 is transmitted to the input rotating shaft 45. The rotational driving force of the input rotating shaft 45 is transmitted to the output rotating shaft 46 through the gear 47.

An input shaft (input shaft to which the driving force is input from the output rotating shaft 42) that is an input interface of the continuously variable transmission structure 16 is the structure input shaft 52. An output shaft (output shaft which outputs the driving force to the input rotating shaft 45) that is an output interface of the continuously variable transmission structure 16 is the CVT output shaft 62. Instead of the toroidal CVT, another type of CVT may be used as the continuously variable transmission 51. For example, when a CVT (for example, a belt CVT) in which an input shaft and an output shaft are parallel to each other is used as the continuously variable transmission 51, the input shaft of the continuously variable transmission structure may be the input shaft of the continuously variable transmission itself.

An end portion 46a (third end portion) of the output rotating shaft 46 of the second power transmitting structure 32 of the accessory gear box 15 is coupled to a driven shaft 17a of the auxiliary compressor structure 17. For example, the output rotating shaft 46 and the driven shaft 17a are located on the same axis. The output shaft 62 of the continuously variable transmission structure 16 and the driven shaft 17a of the auxiliary compressor structure 17 are located on respective axes different from each other.

The structure input shaft 52 of the continuously variable transmission structure 16, the CVT output shaft 62 of the continuously variable transmission structure 16, and the driven shaft 17a of the auxiliary compressor structure 17 are respectively coupled to the end portions 42a, 45a, and 46a which are different from each other among all the end portions of the rotating shafts 41, 42, 45, and 46 of the accessory gear box 15.

An accessory 26 is coupled to at least one of the end portions of the rotating shafts 41, 42, 45, and 46 of the accessory gear box 15 other than the end portions 42a, 45a, and 46a. Examples of the accessory 26 include a drive mechanism-integrated electric power generator (Integrated Drive Generator; IDG), a fuel pump, and a hydraulic pump.

According to the above-described configuration, since the accessory gear box 15, the continuously variable transmission structure 16, and the auxiliary compressor structure 17 are included in the assembly 25, the size of equipment that transmits the driving force from the gas turbine engine 1 to the auxiliary compressor structure 17 can be reduced, and the equipment can be easily mounted on the gas turbine engine 1.

Moreover, the input shaft 52 of the continuously variable transmission structure 16 is coupled to the first power transmitting structure 31, and the output shaft 62 of the continuously variable transmission structure 16 and the driven shaft 17a of the auxiliary compressor structure 17 are coupled to the second power transmitting structure 32. Therefore, the size of a power transmitting path from the gas turbine engine 1 through the continuously variable transmission structure 16 to the auxiliary compressor structure 17 can be reduced.

Moreover, the input shaft 52 of the continuously variable transmission structure 16, the output shaft 62 of the continuously variable transmission structure 16, and the driven shaft 17a of the auxiliary compressor structure 17 are respectively coupled to the different end portions 42a, 45a, and 46a of the rotating shafts 41, 42, 45, and 46 of the accessory gear box 15. Therefore, attaching positions of the continuously variable transmission structure 16 and the auxiliary compressor structure 17 on the side surfaces 29a and 29b of the accessory gear box 15 having the elongated shape are easily changed along the longitudinal direction of the accessory gear box 15. Thus, the degree of freedom of the attaching can be improved. Furthermore, an overhang amount of the assembly 25 can be suppressed when viewed from the accessory gear box 15 fixed to the gas turbine engine 1.

Moreover, the continuously variable transmission structure 16 and the auxiliary compressor structure 17 overlap the circular-arc accessory gear box 15, which extends in the circumferential direction Y of the gas turbine engine 1, in the axial direction X. Therefore, the assembly 25 can be located in a space that is small in the circumferential direction Y of the gas turbine engine 1.

Moreover, the continuously variable transmission structure 16 and the auxiliary compressor structure 17 are respectively attached to the side surfaces 29a and 29b of the accessory gear box 15 which are opposite to each other. Therefore, a moment acting on the accessory gear box 15 from the continuously variable transmission structure 16 and a moment acting on the accessory gear box 15 from the auxiliary compressor structure 17 can at least partially cancel each other. Thus, the stress of a fixing structure of the accessory gear box 15 fixed to the gas turbine engine 1 can be reduced.

Attaching positions of the continuously variable transmission structure 16 and the auxiliary compressor structure 17 with respect to the accessory gear box 15 may be changed in the circumferential direction Y (longitudinal direction of the accessory gear box 15). For example, the attaching position of the continuously variable transmission structure 16 and the attaching position of the auxiliary compressor structure 17 may be replaced with each other in the circumferential direction Y. Moreover, the arrangement of the continuously variable transmission structure 16 and the arrangement of the auxiliary compressor structure 17 may be replaced with each other in the axial direction X. To be specific, the continuously variable transmission structure 16 may be attached to the first side surface 29a of the accessory gear box 15, and the auxiliary compressor structure 17 may be attached to the second side surface 29b of the accessory gear box 15.

Figure 4:
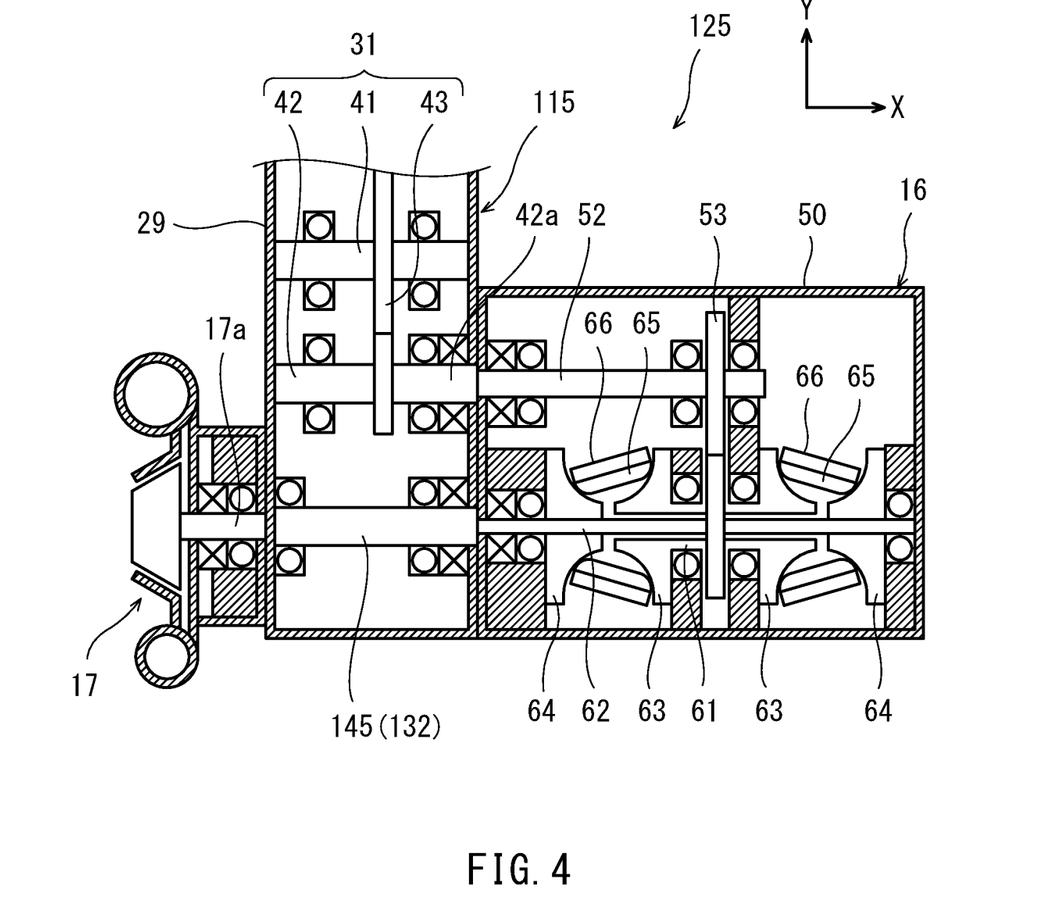
FIG. 4 is a sectional view showing a first modified example of the assembly shown in FIG. 3.

FIG. 4 is a sectional view showing a first modified example of the assembly 25 shown in FIG. 3. The same reference signs are used for the same components as in the above embodiment, and the repetition of the same explanation is avoided. As shown in FIG. 4, in an assembly 125 according to the first modified example, the CVT output shaft 62 of the continuously variable transmission structure 16 and the driven shaft 17a of the auxiliary compressor structure 17 are located on the same axis. A second power transmitting structure 132 of an accessory gear box 115 includes a rotating shaft 145. The CVT output shaft 62 of the continuously variable transmission structure 16 is coupled to one of end portions of the rotating shaft 145. The driven shaft 17a of the auxiliary compressor structure 17 is coupled to the other end portion of the rotating shaft 145. According to this, a moment acting on the accessory gear box 15 from the continuously variable transmission structure 16 and the auxiliary compressor structure 17 can be reduced.

The arrangement of the continuously variable transmission structure 16 and the arrangement of the auxiliary compressor structure 17 may be replaced with each other in the axial direction X. To be specific, the continuously variable transmission structure 16 may be attached to the first side surface 29a of the accessory gear box 115, and the auxiliary compressor structure 17 may be attached to the second side surface 29b of the accessory gear box 115.

Figure 5:
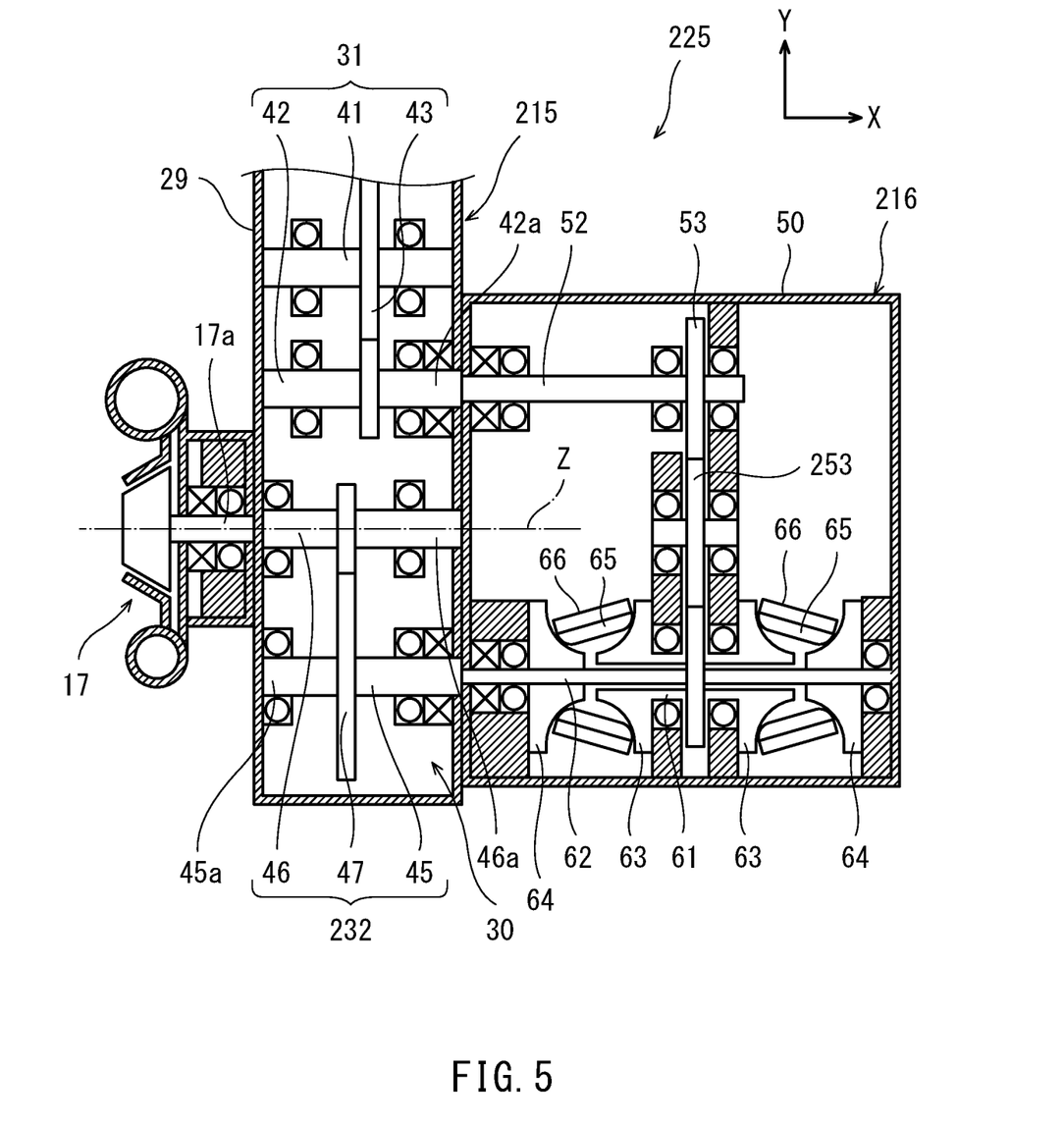
FIG. 5 is a sectional view showing a second modified example of the assembly shown in FIG. 3.

FIG. 5 is a sectional view showing a second modified example of the assembly 25 shown in FIG. 3. The same reference signs are used for the same components as in the above embodiment, and the repetition of the same explanation is avoided. As shown in FIG. 5, in an assembly 225 according to the second modified example, the driven shaft 17a of the auxiliary compressor structure 17 overlaps a continuously variable transmission structure 16 when viewed in the axial direction X. Specifically, an extended line Z of an axis of the driven shaft 17a of the auxiliary compressor structure 17 is located between the structure input shaft 52 and the CVT output shaft 62 in the continuously variable transmission structure 216 when viewed from the radial direction of the gas turbine engine 1 (see FIG. 1).

In the continuously variable transmission structure 216, the rotation of the structure input shaft 52 is transmitted to the CVT input shaft 61 through gears 253. In a second power transmitting structure 232 of an accessory gear box 215, the output rotating shaft 46 (third rotating shaft) is located closer to the output rotating shaft 42 (first rotating shaft) of the first power transmitting structure 31 than the input rotating shaft 45 (second rotating shaft) is. To be specific, the output rotating shaft 46 (third rotating shaft) is located between the input rotating shaft 45 (second rotating shaft) and the output rotating shaft 42 (first rotating shaft) when viewed in the radial direction of the gas turbine engine 1 (see FIG. 1).

In the continuously variable transmission structure 216, three gears 253 are located at a power transmitting path from the structure input shaft 52 to the CVT input shaft 61, but the number of gears 253 may be a value (for example, two) other than three. The arrangement of the continuously variable transmission structure 216 and the arrangement of the auxiliary compressor structure 17 may be replaced with each other in the axial direction X. To be specific, the continuously variable transmission structure 216 may be attached to the first side surface 29a of the accessory gear box 215, and the auxiliary compressor structure 17 may be attached to the second side surface 29b of the accessory gear box 215.

Figure 6:
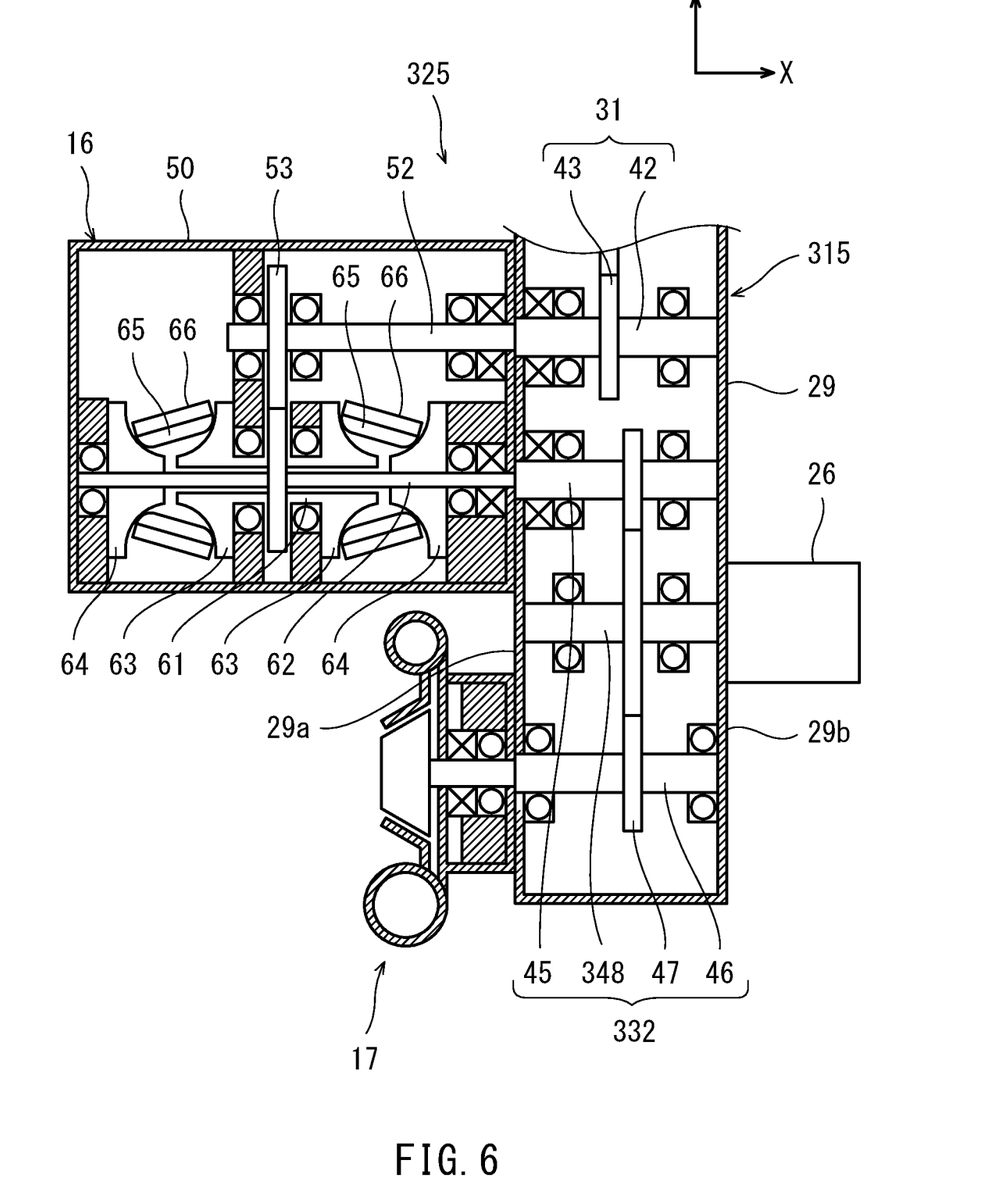
FIG. 6 is a sectional view showing a third modified example of the assembly shown in FIG. 3.

FIG. 6 is a sectional view showing a third modified example of the assembly 25 shown in FIG. 3. The same reference signs are used for the same components as in the above embodiment, and the repetition of the same explanation is avoided. As shown in FIG. 6, in an assembly 325 according to the third modified example, the continuously variable transmission structure 16 and the auxiliary compressor structure 17 are located at the same side of an accessory gear box 315. The continuously variable transmission structure 16 and the auxiliary compressor structure 17 are attached to the first side surface 29a of the case 29 of the accessory gear box 315. The continuously variable transmission structure 16 and the auxiliary compressor structure 17 are lined up in the circumferential direction Y (longitudinal direction of the accessory gear box 315).

In a second power transmitting structure 332 of the accessory gear box 315b, an intermediate rotating shaft 348 is located between the input rotating shaft 45 and the output rotating shaft 46. To be specific, the rotational driving force transmitted from the CVT output shaft 62 of the continuously variable transmission structure 16 to the input rotating shaft 45 is transmitted to the output rotating shaft 46 through the intermediate rotating shaft 348 by the gear 47. The accessory 26 is fixed to the second side surface 29b of the case 29 of the accessory gear box 315. For example, the accessory 26 may be coupled to the intermediate rotating shaft 348. According to this configuration, the size of the assembly 325 including the accessory gear box 315, the continuously variable transmission structure 16, and the auxiliary compressor structure 17 can be reduced in the axial direction X.

The attaching position of the continuously variable transmission structure 16 and the attaching position of the auxiliary compressor structure 17 may be replaced with each other in the circumferential direction Y. Moreover, the continuously variable transmission structure 16 and the auxiliary compressor structure 17 may be attached to the second side surface 29b of the accessory gear box 15.

The present disclosure is not limited to the above-described embodiment. Modifications, additions, and eliminations may be made with respect to the configuration of the embodiment. For example, some of components or methods in one embodiment or one modified example may be applied to another embodiment or another modified example. Some of components in an embodiment or a modified example may be separated and arbitrarily extracted from the other components of the embodiment or the modified example.

The invention claimed is:

1. A compressed air supply system comprising:
a bleed air passage fluidly connected to a bleed air port of a gas turbine engine;
an auxiliary compressor structure including a compressor inlet and a compressor outlet, the compressor inlet being fluidly connected to the bleed air passage;
a supply passage which is fluidly connected to the compressor outlet and through which compressed air from the auxiliary compressor structure is supplied to an air cycle machine;
an accessory gear box which houses a power transmitting structure and to which rotational driving force of the gas turbine engine is input, the power transmitting structure including rotating shafts and gears; and
a transmission structure that changes speed a rotational driving force output from the accessory gear box and rotates the auxiliary compressor structure, wherein:
the transmission structure and the auxiliary compressor structure are fixed to the accessory gear box;
the accessory gear box is fixed to the gas turbine engine;
the rotating shafts include a first rotating shaft, a second rotating shaft, and a third rotating shaft;
the power transmitting structure includes a first power transmitting structure and a second power transmitting structure mechanically separated from the first power transmitting structure;
the first power transmitting structure includes the first rotating shaft directly coupled to an input shaft of the transmission structure;
the second power transmitting structure includes the second rotating shaft directly coupled to an output shaft of the transmission structure and the third rotating shaft that operates in association with the second rotating shaft and is directly coupled to the driven shaft of the auxiliary compressor structure; and
the third rotating shaft is located between the first rotating shaft and the second rotating shaft.

2. The compressed air supply system according to claim 1, wherein:
the accessory gear box has a shape extending in one direction;
the rotating shafts extend in a width direction orthogonal to a longitudinal direction of the accessory gear box and are lined up in the longitudinal direction;
the input shaft of the transmission structure is coupled to an end portion of the first rotating shaft;
the output shaft of the transmission structure is coupled to an end portion of the second rotating shaft; and
the driven shaft of the auxiliary compressor structure is coupled to an end portion of the third rotating shaft.

3. The compressed air supply system according to claim 2, wherein:
the accessory gear box has a circular-arc shape extending along a circumferential direction of the gas turbine engine; and
the transmission structure and the auxiliary compressor structure overlap the accessory gear box in an axial direction of the gas turbine engine.

4. The compressed air supply system according to claim 1, wherein the output shaft of the transmission structure and the driven shaft of the auxiliary compressor structure are located on respective axes different from each other.

5. The compressed air supply system according to claim 3, wherein:
the accessory gear box includes a first side surface and a second side surface opposite to the first side surface;
the auxiliary compressor structure is attached to the first side surface of the accessory gear box; and
the transmission structure is attached to the second side surface of the accessory gear box.

* * * * *